United States Patent [19]
Yamada

[11] Patent Number: 6,020,949
[45] Date of Patent: Feb. 1, 2000

[54] DEVICE AND AUTOMATIC CORRECTION METHOD FOR SURFACE LIGHT SOURCE

[75] Inventor: Jyunji Yamada, Wakayama-ken, Japan

[73] Assignee: Noritsu Koki Co., Ltd., Wakayama, Japan

[21] Appl. No.: 08/934,737

[22] Filed: Sep. 22, 1997

[30] Foreign Application Priority Data

Oct. 2, 1996 [JP] Japan .................................. 8-261742

[51] Int. Cl.$^7$ ............................ G03B 27/52; G03B 27/72
[52] U.S. Cl. .............................. 355/27; 355/20; 355/41; 396/569; 396/578
[58] Field of Search ................................ 355/27, 28, 20, 355/38, 41; 358/525, 523, 461; 396/567, 569, 578

[56] References Cited

U.S. PATENT DOCUMENTS

| | | | |
|---|---|---|---|
| 3,574,464 | 4/1971 | Howland | 356/126 |
| 4,335,956 | 6/1982 | Findeis et al. | 355/27 |
| 4,468,693 | 8/1984 | Fujita et al. | 358/78 |
| 4,751,377 | 6/1988 | Ishikawa et al. | 250/205 |
| 4,860,116 | 8/1989 | Nakajima | 358/447 |
| 5,051,776 | 9/1991 | Mancino | 355/77 |
| 5,053,879 | 10/1991 | Kubota | 358/244 |
| 5,319,408 | 6/1994 | Shiota | 396/569 |
| 5,440,365 | 8/1995 | Gates et al. | 396/570 |
| 5,661,544 | 8/1997 | Ishikawa et al. | 355/41 |
| 5,745,215 | 4/1998 | Miyauchi et al. | 355/38 |
| 5,748,331 | 5/1998 | Kohler | 355/77 |

FOREIGN PATENT DOCUMENTS

0070677  1/1983  European Pat. Off. .

Primary Examiner—Alan A. Mathews
Attorney, Agent, or Firm—Smith Patent Office

[57] ABSTRACT

An automatic correction method is used in connection with a device for correcting an image on a surface light source that can be reproduced with a high degree of quality on a print or a developed film by compensating for the effects of a lens system and the photosensitive material properties as well as the effects of the properties of the surface light source. Photographic printing paper is exposed to a calibration pattern and is transferred to the development section to be developed. Thus, the calibration pattern image is formed on the print paper. The density of each portion of the calibration pattern image on the print is measured in a density measurement section and stored in a memory device. A microprocessor reads the measured values out of a memory device and corrects the image data stored in a frame memory based on the measured values. Thus, the effects of the lens system and the photosensitive properties of the printing paper P as well as the effects of the luminance properties of the displayed image on the surface light source can be compensated for, so that the displayed image on the surface light source can be reproduced on the printing paper with a high degree of quality.

6 Claims, 3 Drawing Sheets

DEVICE AND AUTOMATIC CORRECTION METHOD FOR SURFACE LIGHT SOURCE

BACKGROUND OF THE INVENTION

1. Field of the Invention

The present invention relates to an automatic correction method and device for automatically correcting an image displayed by a surface light source corresponding to a given set of image data and exposing the photosensitive material such as photographic printing paper, film, and the like to the image.

2. Discussion of the Related Art

Some conventional technologies have been known for displaying a certain image on a surface light source such as a CRT or a liquid crystal display and then exposing photosensitive material such as photographic printing paper or film to the light source with the image. When the photosensitive material is exposed to the surface light source with the image displayed thereon, a luminance and a chromaticity of the displayed image should be kept within the limits of respective allowable ranges.

In response to this requirement, some automatic correction methods have been proposed for controlling the luminance and the chromaticity of the displayed image within respective allowable ranges.

One example of an automatic correction method is disclosed by Japanese Patent Laid-Open Publication No. 52958/1992. In the automatic correction method disclosed thereby, a calibration pattern is displayed on a surface light source, and a luminance L of each pixel at the coordinate (x, y) which composes the calibration pattern is measured by a luminance meter placed close to the surface light source. Further luminance data of each pixel (x, y, L) is obtained as an electro-optical transforming characteristic of the surface light source. Then the image data corresponding to the image displayed on the surface light source is corrected by a feedback process according to the electro-optical transforming characteristics. In this conventional method, first the image data is corrected and then the image corresponding to the corrected image data is displayed on the surface light source, so that the variations in the luminance and the chromaticity of the displayed image can be easily controlled and kept within respective allowable ranges.

SUMMARY OF THE INVENTION

When photosensitive material such as a photographic printing paper or a film are exposed to a surface light source with a displayed image thereon, a lens system is usually disposed between the surface light source and the photosensitive material. Accordingly, when a luminance meter is placed close to the surface light source as described above, the variation in luminance at the position of the luminance meter can be compensated for, but the variations caused by the effect of the lens system (for example, a reduced amount of light in the peripheral portion) still remains without being compensated. As for the effect due to the properties of the photosensitive material, variations in the luminance caused by these properties also remain uncompensated.

Therefore, when the surface light source is automatically corrected based on the conventional technology mentioned above, the effects of the lens system and the photosensitive properties of the photosensitive material are not taken into account. The photosensitive material is exposed to the light source with the displayed image without the effects of the lens system and the like being compensated. Consequently, a print and a developed film which are processed by an exposing treatment followed by a developing treatment may have a problem such as a deteriorated quality in the image reproduced on the print and the developed film.

The present invention has been developed to solve the problems mentioned above. An object of the invention is to provide an automatic correction method that can be used with a device for correcting an image on a surface light source that can be reproduced on a print or a developed film with a high degree of quality by compensating for the effects of a lens system and the properties of a photosensitive material as well as the effect of the properties of the surface light source.

The invention relates to an automatic correction method of a surface light source for automatically correcting the surface light source which displays an image corresponding to a given set of image data and exposes a photosensitive material to the image. In order to accomplish the object mentioned above, the automatic correction method comprises the steps of:

displaying a calibration pattern on the surface light source and exposing the photosensitive material to the light source with the calibration pattern;

forming a calibration pattern image by developing the exposed photosensitive material with the calibration pattern;

measuring a density of each portion of the calibration pattern image; and correcting the image data based on a measured value obtained by the density measurement.

According to this invention, a photosensitive material exposed to a calibration pattern is developed to form a calibration pattern image. Then the density of each portion of the calibration pattern image is measured. Based on the measured values obtained in the above process, an actual image data is corrected. Thus, instead of simply displaying the calibration pattern on the surface light source and obtaining the variations in luminance and the like of the displayed image (calibration pattern), the variation in the density of the calibration pattern image which is formed on a print or a developed film by exposing and developing treatments is obtained and then the image data is corrected based on the variations in density.

The invention can also employ a calibration pattern extending in the radial direction from the center of the exposure. Therefore, when there exists variations in the density of the concentric pattern spreading from the center of the exposure on the print or the developed film caused by the effect of lens system, such a variation in density can be positively compensated by measuring the density of each portion of the calibration pattern image extending in the radial direction from the center of exposure. In this calibration pattern, the area for measuring the density is limited to predetermined areas, so that the time necessary for compensating can be greatly reduced compared with that of the calibration pattern spreading all over the surface light source.

The invention can also employ a calibration pattern using a grid pattern. With this type of pattern, the time necessary for compensating can also be reduced because the area for measuring the density decreases to about one half of that compared to the calibration pattern spreading all over the surface light source.

The invention also relates to an automatic correction device of a surface light source for automatically correcting the surface light source which displays an image corresponding to a given set of image data and exposes a photosensitive material to the image. In order to accomplish the object mentioned above, the automatic correction device comprises:

a developing means for forming a calibration pattern image by developing the exposed photosensitive material with the calibration pattern;

a measuring means for measuring a density of each portion of the calibration pattern image; and a correcting means for correcting the image data based on a measured value obtained by the measuring means.

In this invention, at first the calibration pattern image is formed by a developing means, and the density of each portion of the calibration pattern image is measured by the measuring means as a measured value. Then the image data is corrected based on the measured values. Thus, the variations in the density of calibration pattern image are obtained after the exposing and developing treatments and then the image data is corrected based on these variations in density.

BRIEF DESCRIPTION OF THE DRAWINGS

The above and other objects and features of the present invention will be clearly understood from the following description with respect to a preferred embodiment thereof when considered in conjunction with the accompanying drawings, wherein the same reference numerals have been used to denote the same or similar parts or elements, and in which.

DETAILED DESCRIPTION OF THE PREFERRED EMBODIMENTS

Figure 1:
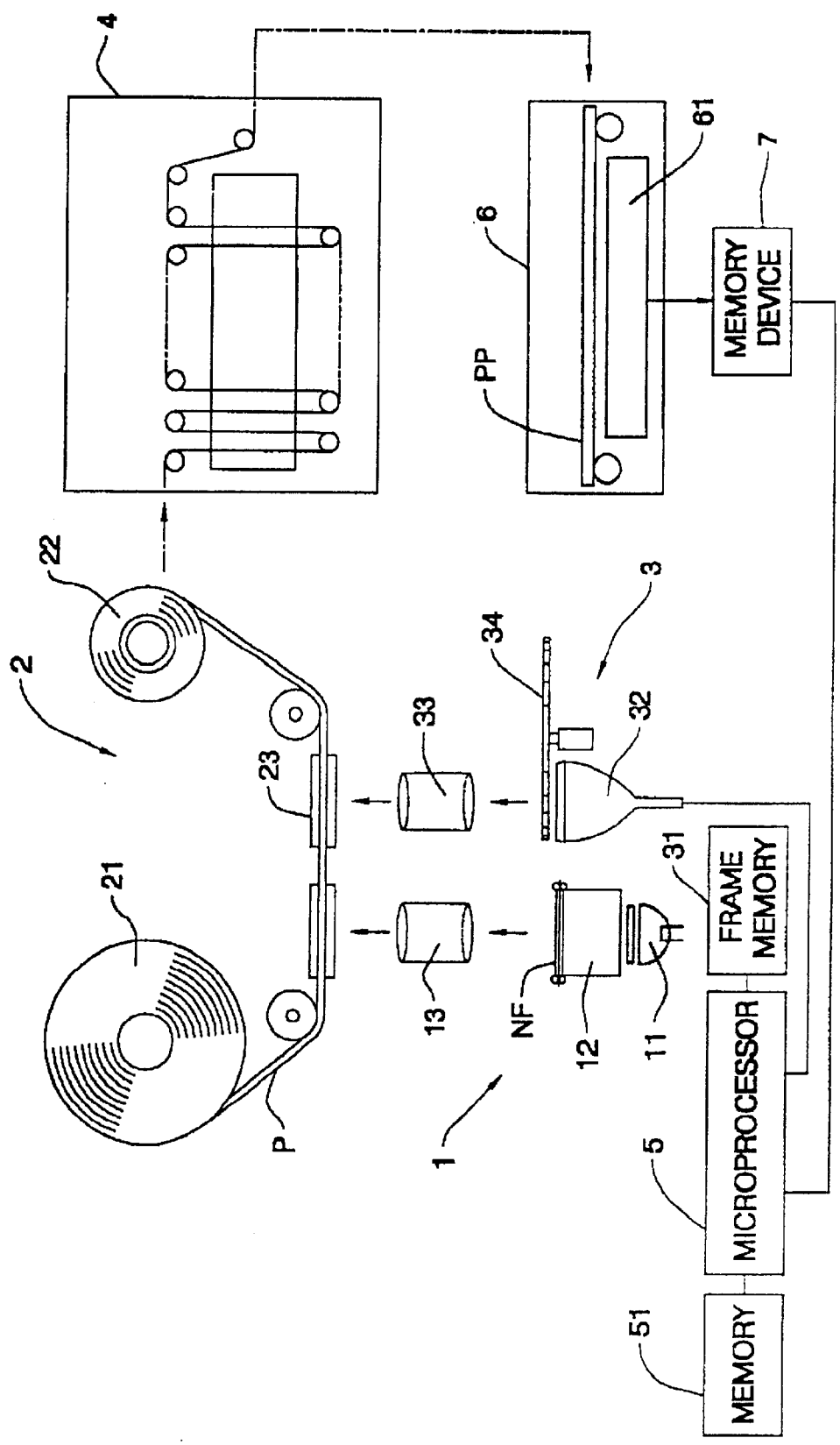
FIG. 1 shows an embodiment of an automatic correction device of a surface light source according to the present invention.

FIG. 1 shows an embodiment of an automatic correction device of a surface light source of the present invention. This automatic correction device is to be incorporated into a photographic system. An outline of the photographic system which employs such a surface light source and the structure and operation of the automatic correction device of surface light source will be described in detail below.

This photographic system, as shown in FIG. 1, comprises a first exposure section 1 comprising a light source 11, an optical exposure unit 12 and a lens system 13. By this first exposure section 1 an image of a negative film NF is exposed to a predetermined part of a photographic printing paper P fed from a printing paper supply section 21. The photographic printing paper, after being exposed to the image of the negative film NF, is transferred to a second exposure section 3 by a conveying device 2. This second exposure section 3 comprises: a frame memory 31 for temporarily storing image data; a surface light source 32 such as a CRT, etc. for displaying an image corresponding to the image data stored in the frame memory 31; a lens system 33 for projecting the image displayed on the surface light source 32 onto the printing paper P; and a non-exposed part of the photographic printing paper P is exposed to the displayed image through a filter ring 34 and the lens system 33 by the first exposure section 1.

As described, the photographic printing paper P exposed to the desired image by the first exposure section 1 and the second exposure section 3 is then wound up by a printing paper roll-up portion 22 of the conveying device 2 and is then conveyed to a development section 4 to be developed. Thus, the image of the negative film NF and the displayed image on the surface light source are printed on the same printing paper. The displayed image may be composed of a character and/or a figure.

In this photographic system, the displayed image shall be corrected as described above. Because of the variations in the luminance and the like of the displayed image on the surface light source 32, the effect of the lens system 33 (for example, reduced amount of light in the peripheral portion) and the properties in the sensitivity of the photographic printing paper P etc. may deteriorate the quality of the printed image corresponding to the displayed image on the surface light source 32. As described above, the deterioration in the quality of the image finally printed can not be prevented if the variations in the luminance and the like of the displayed image on the surface light source 32 are simply compensated for as in the conventional technology.

Therefore, in this embodiment, a photographic system incorporates an automatic correction device for a surface light source as described below. Namely, in this automatic correction device, a memory 51 which has stored the image data for the calibration pattern in advance is connected to a microprocessor 5 for controlling the surface light source 32. The image data of calibration pattern is read out of the memory 51 and the calibration pattern is displayed on the surface light source 32. The printing paper P is exposed to the displayed image through the filter ring 34 and the lens system 33. As a calibration pattern, for example, a gray image of 0.7–1.0 density displayed all over the surface light source 32 can be employed. The following description assumes that this gray image has been employed as a calibration pattern.

This automatic correction device has a reflection type of density measurement section 6. This density measurement section 6 sheds light on a print PP which has been processed in the development section 4 by developing the printing paper P which has been previously exposed to the calibration pattern as mentioned above and that has received the reflected light by a photodetector 61 to measure the density of each portion of the calibration pattern image formed on the print PP. To this density measurement section 6 is connected a memory device 7 for storing temporarily the measured values (density values) determined by the density measurement section 6.

An automatic correction device of the surface light source 32 as mentioned above operates as follows under the control of the microprocessor 5.

Figure 2:
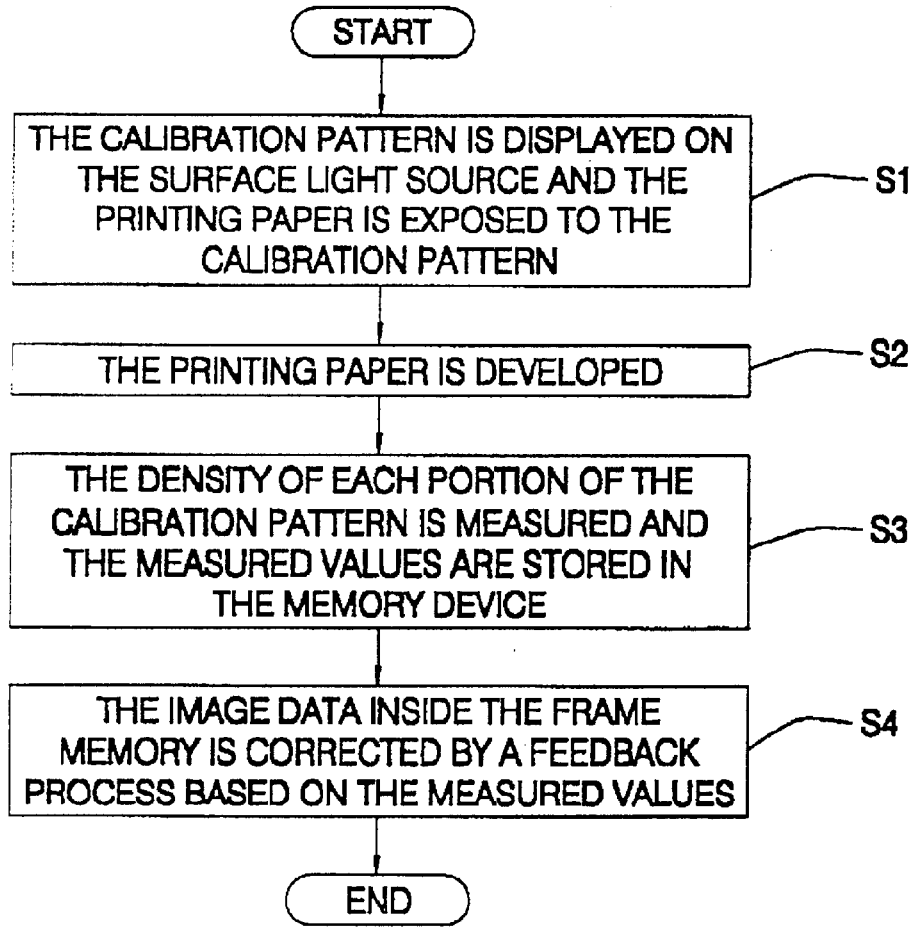
FIG. 2 is a flowchart of an operation of the automatic correction device of the surface light source shown in FIG. 1.

FIG. 2 is a flowchart of an operation of the automatic correction device of the surface light source in FIG. 1. As shown in FIG. 2, at step S1, the image data of the calibration pattern is read out of the memory 51, and, in this case, the gray image of 0.7–1.0 density is displayed as a calibration pattern all over the surface light source such as CRT 32. This image (calibration pattern) is projected for exposure, for example, in the exposure size of 4×7 inches onto the printing paper P through the filter ring 34, the lens system 33 and a print mask 23.

After exposure to the calibration pattern is completed, the printing paper P is developed in the development section 4

(step S2), and then the calibration pattern is visualized to form the calibration pattern image. In this case, the calibration pattern image formed on the printing paper P is a gray image covering the exposure size of 4×7 inches.

Figure 3:
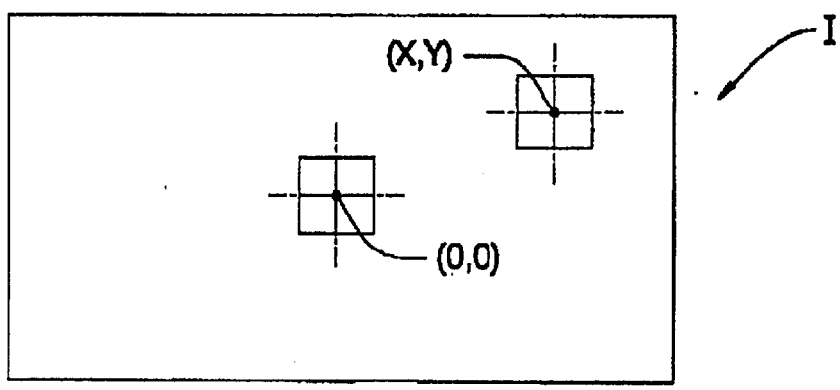
FIG. 3 is a schematic drawing illustrating an embodiment of a calibration pattern image.

In the next step S3, the print PP printed in the development section 4 is conveyed to the density measurement section 6 by a conveying mechanism (or by a manual operation), not shown, and is set to a predetermined position. Then the density of each portion of the calibration pattern image is measured. That is, the density D(X,Y) at each portion with the coordinate (X,Y) of the calibration pattern image I, including the density D(0,0) at the center of the exposure (0,0) in FIG. 3, is measured all over the image I, and these measure values (0,0,D(0,0)), . . . , (X,Y,D(X,Y)) are stored in the memory device 7 (step S3).

When the density measurement is completed all over the image I, the measured values (0,0,D(0,0)), . . . , (X,Y,D(X,Y)) stored in the memory device 7 are read out and judged whether the density difference among these data is within a desired range, for example, from +0.05 to −0.25. When the density difference is judged to be within the desired range, there is no substantial variations in density. Therefore, the displayed image can be reproduced on the final printing paper with a good quality even if the image is displayed on the surface light source 32 according to the image data stored in the frame memory 31 without any correction. On the other hand, when the density difference is judged to be outside of the desired range, the image data in the frame memory 31 is corrected by a feedback process according to these measured values (step S4). This correction compensates for the effect of variations in the luminance and the like of the displayed image on the surface light source 32, the effect of the lens system 33, and the effect of the properties of the sensitivity of the printing paper P and the like. Therefore the image displayed on the surface light source 32 can be reproduced on the print PP without any significant quality deterioration.

In this embodiment, the displayed image on the surface light source 32 can be accurately reproduced on the print PP because the image data of the displayed image is corrected with all the factors which may cause quality deterioration of the displayed image printed on the final print PP taken into account. This is done by obtaining the variations in the luminance of the final form after the exposing and the developing processes, namely, using the image I of the calibration pattern formed on the print PP, and by correcting the image data through a feedback process based on the variations. The image data of the displayed image is not simply corrected based on the variations in the luminance and the like of the image displayed on the surface light source 32 as in the conventional technology. As has been described, the microprocessor 5 serves as a correction means in this embodiment.

Figure 4:
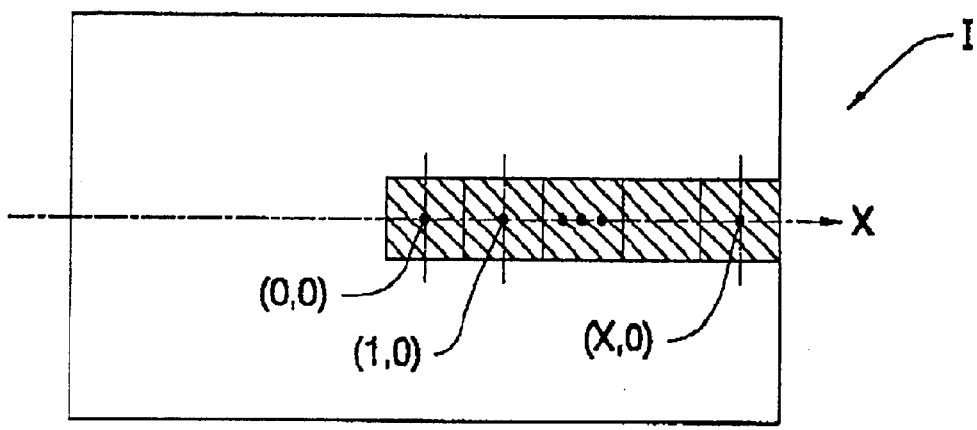
FIG. 4 is a schematic drawing illustrating another embodiment of a calibration pattern image.

Though the embodiment mentioned above employs a pattern of a gray image covering the surface light source 32 as a calibration pattern, the calibration pattern is not restricted to the pattern of a gray image. A pattern extending in the radial direction X from the center of the exposure (0,0), as shown in FIG. 4, may be employed when the effect of the lens system 33, for example, is a main factor for the deterioration in the quality of the displayed image on the final printing paper. Since the effect of the lens system 33 generally spreads concentrically from the center of exposure, the effect of the lens system 33 can be determined from the measured density value with a comparatively high degree of accuracy by measuring the density in a radial direction X. A desired image can consequently be reproduced with the limited effect of the lens system 33 by correcting the image data based on these measured values. Particularly in this case, the density measuring area (the area with slanted lines in FIG. 4) decreases dramatically compared with that of the gray image (FIG. 3), so that the time necessary for correcting the surface light source 32 can be greatly reduced.

Figure 5:
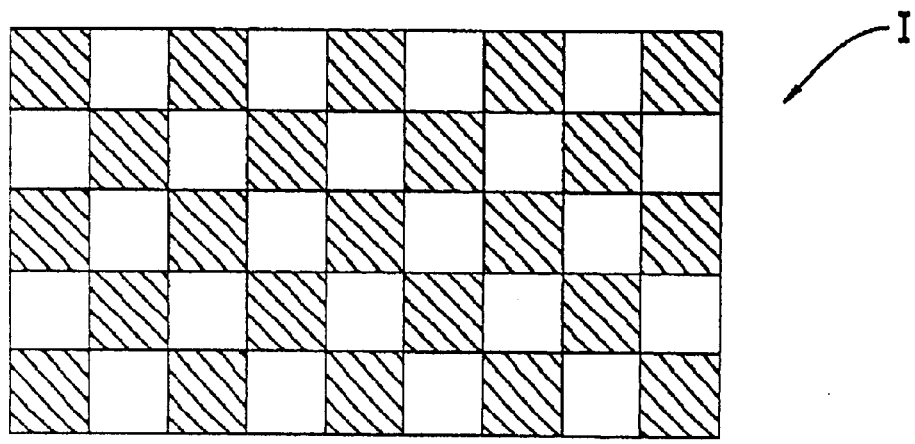
FIG. 5 is a schematic drawing illustrating a further embodiment of a calibration pattern image.

Besides the gray image and the pattern extending in the radial direction described above, a grid pattern shown in FIG. 5 may be employed as a calibration pattern. This grid pattern can reduce the time necessary for correcting the surface light source 32, while securing a higher correction accuracy than that in case of the calibration pattern of FIG. 4 because the density measurement area decreases to about one half of that compared with the gray image.

The embodiment described above refers to a photographic system in which the projection of a displayed image of the surface light source for exposure comes after that of the image of the negative film for exposure. The present invention is also applicable to a photographic system in which only a displayed image of the surface light source is projected for exposure. In the embodiment described above, though the development section 4 of the photographic system is commonly utilized without any modification as a part of the automatic correction device of the surface light source, another development section which is separated from the development section 4 but which has the same developing properties may be prepared to develop the exposed photographic printing paper P with a calibration pattern.

The present invention has been described in the case where the invention is applied to a photographic system for printing the image displayed on the surface light source 32 onto a final printing paper. However the invention is not limited to the details of the above description but is applicable to a photographic system in which a film is exposed to an image displayed on the surface light source and then the film is developed. The image displayed on the surface light source 32 can also be accurately reproduced onto a developed film as in the case described above. In this case, the density measurement section 6 will be made up of a transmission type of density measurement device which measures density by receiving transmitted light.

According to the automatic correction device and method of the surface light source of the present invention, as described above, a calibration pattern image is formed by developing an exposed photosensitive material with the calibration pattern. The density of each portion of this calibration pattern image is measured and then an actual image data is corrected based on the measured values. Therefore the effects of the lens system and the photosensitive material properties as well as the luminance properties of the displayed image on the surface light source can be compensated. As a result, a displayed image on the surface light source can be reproduced with a high degree of quality onto printing paper or a developed negative film.

Particularly, the invention can employ a calibration pattern extending in the radial direction from the center of exposure and this can greatly reduce the time necessary for correction compared with that employing a pattern covering all of the surface light source because the density measurement is applied to a limited area.

In addition, the invention can employ a grid calibration pattern which reduces the time necessary for correction compared with using a pattern spreading all over the surface light source because the density measurement area is reduced by about half.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. An automatic correction method for automatically correcting a surface light source which displays an image corresponding to a given set of image data and exposes a photosensitive material to the image, said method comprising the steps of:

displaying a calibration pattern extending in a radial direction from a center of the exposure which only partially occupies the image on the surface light source;

exposing the photosensitive material to the surface light source with the calibration pattern;

forming a calibration pattern image by developing the photosensitive material exposed with said calibration pattern in said step of exposing;

measuring a density of at least a portion of the calibration pattern image; and correcting a quantity of light leaving the surface light source based on a measured value obtained in said step of measuring a density.

2. An automatic correction method of surface light source as claimed in claim 1, wherein said step of displaying includes using a lens located between said light source and said photosensitive material.

3. An automatic correction device comprising:

a surface light source that displays an image corresponding to a calibration pattern thereon, said calibration pattern extending in a radial direction from a center thereof and arranged so that said calibration pattern only partially occupies the image;

exposing means for exposing a photosensitive material to said surface light source with the calibration pattern;

a developing means for forming a calibration pattern image by developing the photosensitive material exposed with said calibration pattern;

a measuring means for measuring a density of each portion of the calibration pattern image, wherein said measuring means measures the density over the entire calibration pattern image; and a correcting means for correcting a quantity of light leaving said surface light source based on a measured value obtained by said measuring means.

4. An automatic correction device as defined in claim 3, further comprising a lens located near said surface light source so that the image is displayed through said lens.

5. An automatic correction method for automatically correcting a surface light source which display an image corresponding to a given set of image data and exposes a photosensitive material to the image, said method comprising the steps of:

displaying a calibration pattern extending in a radial direction from a center of the exposure on the surface light source, using a lens located between said light source and said photosensitive material;

exposing the photosensitive material to the surface light source with the calibration pattern; forming a calibration pattern image by developing the photosensitive material exposed with said calibration pattern in said step of exposing;

measuring a density of at least a portion of the calibration pattern image; and correcting a quantity of light leaving the surface light source based on a measured value obtained in said step of measuring a density.

6. An automatic correction device comprising:

a surface light source that displays, through a lens, an image corresponding to a calibration pattern thereon, said calibration pattern extending in a radial direction from a center thereof;

exposing means for exposing a photosensitive material to said surface light source with the calibration pattern;

a developing means for forming a calibration pattern image by developing the photosensitive material exposed with said calibration pattern;

a measuring means for measuring a density of each portion of the calibration pattern image, wherein said measuring means measures the density over the entire calibration pattern image; and a correcting means for correcting a quantity of light leaving said surface light source based on a measured value obtained by said measuring means.

* * * * *